April 13, 1965
C. R. PORTER
3,177,981
HYDRAULIC LOCKING DEVICE
Filed April 16, 1963
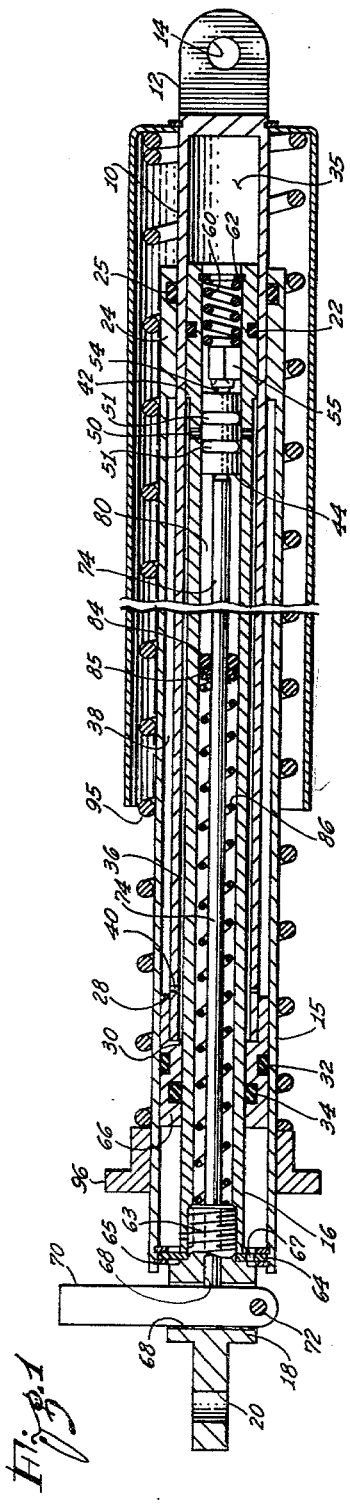
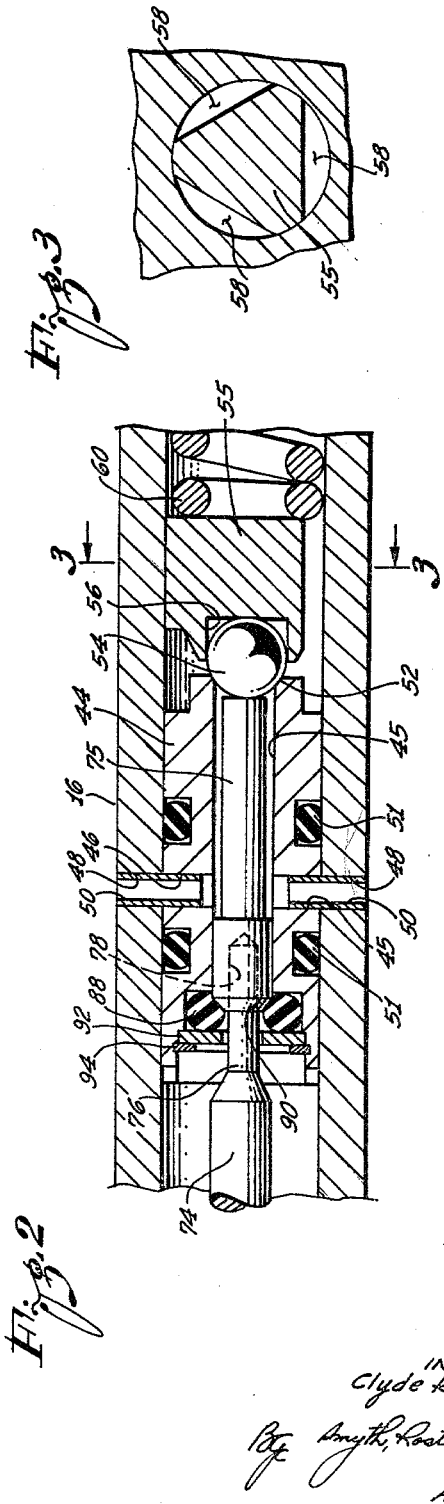
INVENTOR.
Clyde R. Porter
By Smyth, Roston & Pavitt
Attorneys

United States Patent Office 3,177,981
Patented Apr. 13, 1965

3,177,981
HYDRAULIC LOCKING DEVICE
Clyde R. Porter, Los Angeles, Calif., assignor to P. L. Porter & Associates, Los Angeles, Calif., a partnership
Filed Apr. 16, 1963, Ser. No. 273,464
8 Claims. (Cl. 188—96)

This invention relates to a hydraulic locking device that is adapted to extend and contract to hold two relatively movable members at selected positions relative to each other.

A typical hydraulic locking device of the type to which the invention pertains comprises a cylinder confining a quantity of hydraulic fluid and a piston dividing the cylinder into two hydraulic chambers, the piston being mounted on a piston rod that extends through both of the two opposite ends of the cylinder.

What may be termed a locking valve controls communication between the two chambers and is normally closed to immobilize the piston. Space is also provided to function as a reservoir for replenishing fluid in communication with at least one of the two hydraulic chambers, the reservoir being adapted to expand and contract to accommodate thermal expansion and contraction of the fluid in the two hydraulic chambers.

A device of this type is disclosed in the Porter Patent 2,922,497, issued January 26, 1960, which patent is hereby incorporated into the present disclosure by reference. The Porter device is widely used for the control of a tiltable back rest of a reclining chair in a passenger aircraft.

An increasing need has developed for a hydraulic locking device of this type that is capable of greater than usual extension. More specifically, the need is for a hydraulic locking device having a greater ratio between its fully extended length and its fully contracted length, so that either a shorter device may be used for a given length of stroke or a greater stroke may be provided by a device of the usual length.

There is also need for greater reservoir capacity in a locking device of a given length. With ample fluid in reserve, a device of this type may operate for a long service period with no attention whatsoever.

The hydraulic locking device disclosed in the Porter patent is a precision device and cannot be produced as economically as devices that are manufactured to less strict specifications.

A third need, then, is for a similar device of less expensive construction for lighter loads. For example, reducing the cost makes it possible to use such devices widely on reclining chairs for busses.

The present invention meets these three needs of greater relative stroke, greater reservoir capacity, and reduced cost, and does so largely by a new construction geometry. In the new construction, one of the hydraulic chambers is a chamber in one end of a cylinder and the usual piston rod is omitted to increase the capacity of this chamber. The second hydraulic chamber comprises a pair of substantially coextensive, interconnected concentric annular compartments, the total cross-sectional area of which is substantially equal to the cross-sectional area of the first chamber. The reservoir for the hydraulic fluid is positioned radially inwardly from the two concentric annular compartments.

The new construction is inherently more economical for a number of reasons. In the first place, the new geometry makes it easier to fabricate and assemble the device. In the second place, since the reservoir automatically compensates for any differences that may exist between the cross-sectional area of the two chambers, liberal dimensional tolerances are permitted. In the third place, the new construction may be made of aluminum instead of steel for light service. As will be made apparent, other features for reducing cost include a novel gland construction for the fluid reservoir, a novel check valve construction and the novel use of roll pins or tubes to serve not only as dowels but also as fluid passages.

The various features and advantages of the invention will be apparent from the following detailed description and the accompanying drawings.

In the drawings, which are to be regarded as merely illustrative:

FIG. 1 is a longitudinal sectional view of the presently preferred embodiment of the invention;

FIG. 2 is an enlarged fragmentary sectional view of a valve arrangement employed in the device; and FIG. 3 is a transverse section along the line 3—3 of FIG. 2.

Referring to FIG. 1, the selected embodiment of the invention comprises two telescoping structures for attachment respectively to two members for controlling the spacing between the two members. In a reclining chair, one member is the tiltable back rest and the other member is a fixed portion of the chair construction. One of the two structures shown in FIG. 1 is a single cylinder 10, having an integral ear 12 at its outer end with an aperture 14 in the ear to receive a screw or the like for attaching the structure to one of the two members. The other structure comprises an outer cylinder 15 and an inner cylinder 16, both of which are connected to an end fitting 18 that has an aperture 20 to receive a screw or the like for attachment to the other of the two members.

The inner cylinder 16 slidingly telescopes into the single cylinder 10 and is provided with a circumferential O-ring 22 at its inner end for sealing contact with the single cylinder. The outer cylinder 15 is formed with an inner circumferential step 24 at its inner end, and this step is provided with an inner circumferental O-ring 25 in sealing contact with the outer circumference of the single cylinder 10. The single cylinder 10 is formed at its inner end with an outer circumferential step 28 and an inner circumferential step 30, the outer circumferential step carrying a circumferential O-ring 32 in sliding sealing contact with the inner surface of the outer cylinder 15 and the inner circumferential step carrying an inner circumferential O-ring 34 in sliding sealing contact with the periphery of the inner cylinder 16. As indicated in the drawing, the two steps 28 and 30 are parts of an annular piston mounted on the end of the single cylinder 10.

As heretofore stated, a locking device of this type has two separate hydraulic chambers with normally closed valve means to control flow between the two chambers. In this embodiment of the invention, one of the two chambers 35 is formed by the single cylinder 10 and the inner end of the inner cylinder 16. The other of the two chambers comprises a pair of concentric annular compartments 36 and 38 which are interconnected by a plurality of radial bores 40 in the wall of the single cylinder 10. The outer annular compartment 38 is defined by the outer cylinder 15, the inner circumferential step 24 of the outer cylinder, the single cylinder 10, and the outer circumferential step 28 of the single cylinder. The other inner annular compartment 36 is defined by the single cylinder 10, the inner circumferential step 30 of the single cylinder, the outer surface of the inner cylinder 16, and an outer circumferential step 42 on the inner end of the inner cylinder.

Fluid flow between the hydraulic chamber 35, on the one hand, and the two interconnected concentric chambers 36 and 38, on the other hand, is controlled by valve means associated with a cylindrical valve body 44 that is mounted in the inner end of the inner cylinder 16.

The valve body 44 has an axial bore or passage 45 throughout its length intersected by a diametrical bore 46 which registers with two corresponding radial bores 48 in the wall of the inner cylinder 16. A pair of tubular members 50 in the form of so-called "roll pins" are mounted in the two radial bores 48 and extend into the diametrical bore 46. It is apparent that the two tubular members 50 serve a dual purpose, since they not only function as dowels to anchor the valve body 44 against longitudinal movement in the inner cylinder 16, but also place the axial passage 45 of the valve body in communication with the inner annular compartment 36. A pair of O-rings 51 on opposite sides of the diametrical bore 46 prevent leakage flow along the periphery of the valve body 44.

The end of the axial passage 45 of the valve body 44 that is directed towards the hydraulic chamber 35 forms a valve seat 52 for a valve member in the form of a ball 54. The ball 54 is guided by a floating cage in the form of a block 55 that has a cylindrical recess 56 for engagement with the ball. As may be seen in FIG. 3, the block is cut away on three sides to provide three passages 58 for fluid flow past the block. To bias the valve ball 54 to its closed position, a relatively heavy coil spring 60 is confined under compression between the block 55 and a snap ring 62 that is anchored in the end of the inner cylinder 16. It is apparent that dislodging the valve ball 54 from the valve seat 52 places the hydraulic chamber 35 in communication with the two concentric compartments 36 and 38.

The valve ball 54 is controlled by operating rod means that extends axially through the inner cylinder 16 from the end fitting 18. As shown in FIG. 1, the end fitting 18 has a nipple portion 63 which is threaded into the end of the inner cylinder 16. For the purpose of fixing the outer cylinder 15, the end fitting 18 clamps a washer 64 against the end of the inner cylinder 16, and this washer is engaged from its opposite sides by a pair of snap rings 65 that seat in corresponding inner circumferential grooves of the outer cylinder 15. A vent to the atmosphere from the annular space 66 may be in the form of one or more apertures 67 in the washer 64.

The end fitting 18 has an axial bore 68 which communicates with the interior of the inner cylinder 16, and the end fitting is further formed with a transverse aperture 69 to accommodate a transverse control lever 70 which is mounted on a pivot 72.

The operating rod means for unseating the normally seated valve ball 54 comprises a long axial rod 74 which extends from the operating lever 70 to the valve body 44 and a second shorter axial rod 75 which is housed in the axial passage 45 of the valve body 44. As shown in FIG. 2, the long rod 74 may be formed with and end portion 76 of reduced diameter with the end portion extending into an axial socket 78 in the shorter rod 75. It is apparent that slight clockwise rotation of the control lever 70, as viewed in FIG. 1, will displace the two interconnected rods 74 and 75 longitudinally to the right to dislodge the valve ball 54 from its seat to permit free flow between the hydraulic chamber 35 and the two annular compartments 36 and 38 as required for free extension or contraction of the device.

The interior of the inner cylinder 16 forms a hydraulic fluid reservoir 80 which is of annular configuration by virtue of the presence of the axial rod 74. One end of the reservoir 80 is defined by a floating gland comprising an O-ring 84 slidingly embracing the axial rod 74 and an annular spring seat 85 abutting the O-ring. The fluid in the reservoir 80 is maintained under constant pressure by a coil spring 86 which is confined under compression between the spring seat 85 and the nipple portion 63 of the end fitting 18.

The second end of the annular fluid reservoir 80 is defined by a check valve shown in FIG. 2, the check valve comprising an O-ring 88 and the chamfered end 75 or annular shoulder 90 of the short axial rod 75. The O-ring 88 is confined by a back-up ring 92, which, in turn, is retained by a snap ring 94.

If the device is to be used to control a tiltable back rest of a reclining chair, it is desirable to add a suitable counterbalance spring. For this purpose a heavy coil spring 95 may surround the outer cylinder 15 to resist longitudinal contraction of the device. One end of the spring abuts an annular member 96 that is fixedly mounted on the outer cylinder 15. The other end of the coil spring extends into a cylindrical guard 98 in abutment with the end wall of the guard. The end wall of the guard may abut a suitable snap ring 102.

Under normal conditions, the coil spring 60 holds the valve ball 54 firmly on its seat and the check valve is closed, the chamfered end 90 of the short axial rod 75 compressing and deforming the O-ring 88. More often than not, the control lever 70 is only lightly actuated to only slightly dislodge the valve ball 54 from the valve seat 52. In those instances the valve ball is dislodged sufficiently for flow between the chamber 35 and the two concentric compartments 36 and 38 to permit extension or contraction of the device, but the check valve does no open. In other words, the chamfered end of the short axial rod 75 merely lessens its pressure on the O-ring 88 without retreating sufficiently to place the hydraulic reservoir 80 in communication with the axial passage 45 of the valve member 44. In other instances, however, the operating lever 70 is actuated to greater extent, with the result that the valve ball 54 is dislodged from its valve seat and, in addition, the check valve is opened by retreat of the chamfered end 90 of the axial rod 75 from the O-ring 88. Thus, the check valve is opened relatively infrequently, but nevertheless is opened often enough to permit the fluid in the chamber 35 and the two annular compartments 36 and 38 to be replenished from the reservoir 80.

It is possible to override the valve spring 60 by applying sufficient mechanical force for extension of the device; i.e., for retraction of the single cylinder 10 relative to the two cylinders 15 and 16. When such an everriding force is applied, the rise in pressure in the two annular compartments 36 and 38 forces the valve ball 54 to retract in opposition to the spring 60.

My description in specific detail of the selected embodiment of the invention will suggest various changes, substitutions, and other departures from my disclosure within the spirit and scope of the appended claims.

I claim:

1. In a hydraulic locking device of the character described for releasably locking two members at selected spacing relative to each other, the combination of:
   a first structure in the form of a single cylinder having an outer closed end for connection to one of said two members and having an inner open end;
   a second structure for connection to the other of said two members, said second structure including an outer cylinder and an inner cylinder fixedly connected thereto, said outer cylinder telescoping over said single cylinder and said inner cylinder slidingly telescoping into the single cylinder with the single cylinder and the inner cylinder forming a variable hydraulic chamber, said single cylinder and said outer and inner cylinders forming two annular compartments interconnected through the wall of the single cylinder, said two compartments together functioning as a second variable hydraulic chamber of substantially the same cross-sectional area as the first hydraulic chamber;
   a hydraulic reservoir inside said inner cylinder;
   passage means in said inner cylinder for communication between the two hydraulic chambers and for communication between the reservoir and the two chambers;

a locking valve in said pasage means normally closed to cut off communication between the two hydraulic chambers; and control means to open said locking valve to permit fluid flow between the two chambers for change in the spacing of the two members.

2. A combination as set forth in claim 1 in which said control means includes an axial rod means extending through said reservoir and into said passage means; and which includes means restricting flow into and out of the reservoir, said restricting means including a circumferential shoulder formed on said rod means and a cooperating elastomeric annular member normally abutting said shoulder.

3. A combination as set forth in claim 1 in which said passage means includes:

a body spanning the interior of said inner cylinder, said body having fluid passages therethrough; and at least one tubular means extending through the wall of the inner cylinder into said body to anchor the body and to serve as a fluid passage member to place said two compartments in communication with the interior of the body.

4. In a hydraulic locking device of the character described for releasably locking two members at selected spacing relative to each other, the combination of:

a first cylinder for connection to one of the two members, the cylinder being closed at one end and open at the other end, the cylinder forming a first hydraulic chamber;

a pair of fixedly interconnected cylinders for connection to the other of the two members, said pair comprising an outer cylinder and an inner cylinder, said pair of cylinders forming an annular space, said first cylinder extending into the annular space;

an annular piston on the end of said first cylinder in sliding engagement with said pair of cylinders;

an inner circumferential sealing means carried by the outer cylinder in sliding contact with the first cylinder;

an outer circumferential sealing means carried by the inner cylinder in sliding contact with the first cylinder, the three cylinders together with said piston forming two variable annular compartments, said first cylinder being apertured for continuous communication between the two compartments;

a hydraulic reservoir inside said inner cylinder;

passage means in said inner cylinder for communication between said first variable hydraulic chamber and said two annular compartments;

a locking valve in said passage means normally closing off communication through the passage means; and control means to open said locking valve to permit fluid flow through the passage means to permit change in the spacing of the two members.

5. In a hydraulic locking device of the character described for releasably locking two members at selected spacing relative to each other, the combination of:

a first structure in the form of a first cylinder having an outer closed end for connection to one of said two members;

a second structure for connection to the other of said two members, said second structure including an outer cylinder and an inner cylinder fixedly connected thereto, said outer cylinder slidingly telescoping over said first cylinder and said inner cylinder slidingly telescoping into the first cylinder;

said first cylinder together with said inner cylinder forming a hydraulic chamber, said three cylinders forming a pair of substantially co-extensive annular compartments in fluid communication through the wall of the inner cylinder;

fluid passage means for flow communication between said chamber and said two compartments through said inner cylinder; and a locking valve to control flow through said passage means.

6. A combination as set forth in claim 5 which includes operating means for operation of said stop valve, said operating means extending through said inner cylinder longitudinally thereof from the outer end of said second structure.

7. In a hydraulic locking device of the character described for releasably locking two members at selected spacing relative to each other, the combination of:

a first structure in the form of a first cylinder having an outer closed end for connection to one of said two members;

a second structure for connection to the other of said two members, said second structure including an outer cylinder and an inner cylinder fixedly connected thereto, said outer cylinder slidingly telescoping over said first cylinder and said inner cylinder slidingly telescoping into the first cylinder, said first cylinder together with said inner cylinder forming a hydraulic chamber, said three cylinders forming a pair of substantially co-extensive annular compartments in fluid communication through the wall of said inner cylinder;

fluid passage means for flow communication between said chamber and said two compartments through said inner cylinder;

a manually operable locking valve to control flow through said passage means; and means in said inner cylinder forming a reservoir for hydraulic fluid under pressure to replenish the fluid in said chamber and said two compartments through said fluid passage means.

8. A combination as set forth in claim 7 which includes an operating rod extending axially through said inner cylinder to operate said stop valve; and in which said reservoir is formed in part by a gland and a cooperating spring, said gland comprising an O-ring embracing said operating rod and an annular seat for said spring, said annular seat surrounding the operating rod between the O-ring and the spring.

References Cited by the Examiner
UNITED STATES PATENTS
3,051,274  8/62  Porter _____ 188—96

ARTHUR L. LA POINT, *Primary Examiner.*
EUGENE G. BOTZ, *Examiner.*